United States Patent
Yersak et al.

(10) Patent No.: US 11,239,459 B2
(45) Date of Patent: Feb. 1, 2022

(54) LOW-EXPANSION COMPOSITE ELECTRODES FOR ALL-SOLID-STATE BATTERIES

(71) Applicant: GM GLOBAL TECHNOLOGY OPERATIONS LLC, Detroit, MI (US)

(72) Inventors: Thomas A. Yersak, Ferndale, MI (US); Mei Cai, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 401 days.

(21) Appl. No.: 16/164,525

(22) Filed: Oct. 18, 2018

(65) Prior Publication Data

US 2020/0127282 A1  Apr. 23, 2020

(51) Int. Cl.
*H01M 4/36* (2006.01)
*H01M 4/485* (2010.01)
(Continued)

(52) U.S. Cl.
CPC .......... *H01M 4/364* (2013.01); *H01M 4/386* (2013.01); *H01M 4/387* (2013.01); *H01M 4/485* (2013.01);
(Continued)

(58) Field of Classification Search
CPC ...... H01M 4/364; H01M 4/485; H01M 4/387; H01M 4/5815; H01M 4/386; H01M 4/13;
(Continued)

(56) References Cited

U.S. PATENT DOCUMENTS

| 8,974,946 B2 | 3/2015 | Cai et al. |
| 9,123,939 B2 | 9/2015 | Xiao et al. |

(Continued)

FOREIGN PATENT DOCUMENTS

| CN | 111081990 A | 4/2020 |
| DE | 102019115081 A1 | 4/2020 |
| WO | WO-2017045573 A1 | 3/2017 |

OTHER PUBLICATIONS

Suzuki et al. ("Composite sulfur electrode for all-solid-state lithium-sulfur battery with Li2S—GeS2—P2S5 based Thio-LISICON Solid electrolyte". Electrochmistry Society of Japan. Dec. 2017).*

Dai et al., U.S. Appl. No. 15/677,760, filed Aug. 15, 2017 entitled "Lithium Metal Battery With Hydrib Electrolyte System," 48 pages.

Yersak et al., U.S. Appl. No. 15/992,878, filed May 30, 2018 entitled "Methods of Manufacturing High-Active-Material-Loading Composite Electrodes and All-Solid-State Batteries Including Composite Electrodes," 55 pages.

Janek et al., "A solid future for battery development," *Nature Energy*, vol. 1, 16141 (Sep. 8, 2016), 4 pages; doi: 10.1038/nenergy.2016.141.

(Continued)

*Primary Examiner* — Stephen J Yanchuk
(74) *Attorney, Agent, or Firm* — Harness, Dickey & Pierce, P.L.C.

(57) ABSTRACT

A composite electrode for use in an all-solid-state electrochemical cell that cycles lithium ions is provided. The composite electrode comprises a solid-state electroactive material that undergoes volumetric expansion and contraction during cycling of the electrochemical cell and a solid-state electrolyte. The solid-state electroactive material is in the form of a plurality of particles and each particle has a plurality of internal pores formed therewithin. Each particle has an average porosity ranging from about 10% to about 75%, and the composite electrode has an interparticle porosity between the solid-state electroactive material and solid-state electrolyte particles ranging from about 5% to about 40%. The intraparticle pores and the interparticle porosity accommodate the volumetric expansion and contraction of the solid-state electroactive material so to minimize outward expansion of the electroactive particles, micro-cracking of the solid-state electrolyte, and delamination within the electrochemical cell.

20 Claims, 3 Drawing Sheets

(51) Int. Cl.
*H01M 10/0525* (2010.01)
*H01M 4/38* (2006.01)
*H01M 4/58* (2010.01)

(52) U.S. Cl.
CPC ..... *H01M 4/5815* (2013.01); *H01M 10/0525* (2013.01)

(58) Field of Classification Search
CPC .......... H01M 4/38; H01M 4/62; H01M 4/134; H01M 10/0565; H01M 10/0525; H01M 10/0562; H01M 2300/0068; H01M 2300/0071
See application file for complete search history.

(56) References Cited

U.S. PATENT DOCUMENTS

| | | | |
|---|---|---|---|
| 9,160,036 B2 | 10/2015 | Yang et al. | |
| 9,252,411 B2 | 2/2016 | Abd Elhamid et al. | |
| 9,302,914 B2 | 4/2016 | Liu et al. | |
| 9,362,552 B2 | 6/2016 | Sohn et al. | |
| 9,373,829 B2 | 6/2016 | Xiao et al. | |
| 9,437,871 B2 | 9/2016 | Zhou et al. | |
| 9,537,144 B2 | 1/2017 | Huang et al. | |
| 9,647,254 B2 | 5/2017 | Dadheech et al. | |
| 9,663,946 B2 | 5/2017 | Frederick | |
| 9,742,028 B2 | 8/2017 | Zhou et al. | |
| 9,896,763 B2 | 2/2018 | Dadheech et al. | |
| 9,905,847 B2 | 2/2018 | Dadheech et al. | |
| 9,923,189 B2 | 3/2018 | Xiao | |
| 9,929,435 B2 | 3/2018 | Cai et al. | |
| 9,979,008 B2 | 5/2018 | Dai et al. | |
| 9,985,284 B2 | 5/2018 | Dadheech et al. | |
| 10,199,643 B2 | 2/2019 | Zhou et al. | |
| 10,431,849 B2 | 10/2019 | Yersak et al. | |
| 10,566,652 B2 | 2/2020 | Dai et al. | |
| 10,629,949 B2 | 4/2020 | Yersak et al. | |
| 10,734,673 B2 | 8/2020 | Yersak et al. | |
| 2012/0100438 A1* | 4/2012 | Fasching | H01M 4/366 429/339 |
| 2015/0056387 A1 | 2/2015 | Dadheech et al. | |
| 2015/0056493 A1 | 2/2015 | Dadheech et al. | |
| 2015/0056507 A1 | 2/2015 | Dadheech et al. | |
| 2015/0236324 A1 | 8/2015 | Xiao et al. | |
| 2015/0349307 A1 | 12/2015 | Dadheech et al. | |
| 2016/0011172 A1 | 1/2016 | Martin et al. | |
| 2016/0017266 A1 | 1/2016 | Morgan | |
| 2016/0020491 A1 | 1/2016 | Dai et al. | |
| 2016/0111721 A1 | 4/2016 | Xiao et al. | |
| 2016/0172681 A1 | 6/2016 | Yang et al. | |
| 2016/0172706 A1 | 6/2016 | Xiao et al. | |
| 2016/0172710 A1 | 6/2016 | Liu et al. | |
| 2017/0021407 A1 | 1/2017 | Ochiai | |
| 2017/0162859 A1 | 6/2017 | Yang et al. | |
| 2017/0214079 A1 | 7/2017 | Dai et al. | |
| 2017/0271678 A1 | 9/2017 | Yang et al. | |
| 2017/0288230 A1 | 10/2017 | Yang et al. | |
| 2017/0338490 A1 | 11/2017 | Xiao et al. | |
| 2018/0048022 A1 | 2/2018 | Yang et al. | |
| 2018/0287207 A1 | 10/2018 | Dai et al. | |
| 2018/0294517 A1 | 10/2018 | Yersak et al. | |
| 2019/0157665 A1* | 5/2019 | Pope | H01M 10/0525 |
| 2019/0341200 A1* | 11/2019 | Liu | H01M 4/38 |
| 2019/0372155 A1 | 12/2019 | Yersak et al. | |
| 2020/0274195 A1* | 8/2020 | Son | H01M 10/04 |

OTHER PUBLICATIONS

Kato et al., "High power all-solid-state batteries using sulphide superionic conductors"; *Nature Energy*, 1, Article No. 16030 (2016) doi:10.1038/nenergy.2016.30.

Koerver et al., "Capacity Fade in Solid-State Batteries: Interphase Formation and Chemomechanical Processes in Nickel-Rich Layered Oxide Cathodes and Lithium Thiophosphate Solid Electrolytes," *Chem. Mater.*, 29, (Jun. 9, 2017), pp. 5574-5582; doi: 10.1021/acs.chemmater.b00931.

Porz et al., "Mechanism of Lithium Metal Penetration through Inorganic Solid Electrolytes," *Adv. Energy Mater.*, 7, 1701003 (Jul. 6, 2017), 12 pages; doi: 10.1002/aenm.201701003.

Li et al., "Mesoporous silicon sponge as an anti-pulverization structure for high-performance lithium-ion battery anodes," *Nature Communications*, 5, 4105 (Jul. 8, 2014); doi:10.1038/ncomms5105.

Xiao et al., "Inward lithium-ion breathing of hierarchically porous silicon anodes," *Nature Communications*, 6, 8844 (Nov. 5, 2015); doi: 10.1038/ncomms9844.

Cho, Jaephil, "Porous Si anode materials for lithium rechargeable batteries." Journal of Materials Chemistry, vol. 20, No. 20, pp. 4009-4014 (2010).

Koerver, Raimund et al., "Chemo-mechanical expansion of lithium electrode materials—on the route to mechanically optimized all-solid-state batteries." Energy & Environmental Science, vol. 11, No. 8, pp. 2142-2158 (2018).

Liu, Nian et al., "A Yolk-Shell Design for Stabilized and Scalable Li-Ion Battery Alloy Anodes." Nano Letters, vol. 12, No. 6, pp. 3315-3321 (2012).

Liu, Xiao Hua et al., "Size-Dependent Fracture of Silicon Nanoparticles During Lithiation." ACS Nano, vol. 6, No. 2, pp. 1522-1531 (2012).

Wang, Da-Wei et al., "Carbon-sulfur composites for Li—S batteries: status and prospects." Journal of Materials Chemistry A, vol. 1, No. 33, pp. 9382-9394 (2013).

Yi, Ran et al., "Micro-sized Si—C Composite with Interconnected Nanoscale Building Blocks as High-Performance Anodes for Practical Application in Lithium-Ion Batteries." Advanced Energy Materials, vol. 3, No. 3, pp. 295-300 (2013).

* cited by examiner

LOW-EXPANSION COMPOSITE ELECTRODES FOR ALL-SOLID-STATE BATTERIES

INTRODUCTION

This section provides background information related to the present disclosure which is not necessarily prior art.

The present disclosure relates to high-energy-density all-solid-state batteries including composite electrodes comprising solid-state electroactive materials that undergo volumetric expansion and contraction during cycling of the respective battery. More specifically, the solid-state electroactive materials are porous so to accommodate the volumetric expansion and contraction of the solid-state electroactive material inwardly and minimize outward expansion of the solid-state electroactive material and micro-cracking within the batteries.

High-energy density, electrochemical cells, such as lithium-ion batteries, can be used in a variety of consumer products and vehicles, including as Hybrid Electric Vehicles ("HEVs") and Electric Vehicles ("EVs"). Typical lithium-ion and lithium-sulfur batteries include two electrodes, an electrolyte material, and a separator. One electrode serves as a positive electrode or cathode and another serves as a negative electrode or anode. Conventional rechargeable lithium-ion batteries operate by reversibly passing lithium ions back and forth between the negative electrode and the positive electrode. Lithium ions move from the positive electrode to the negative electrode during charging of the battery, and in the opposite direction when discharging the battery. A separator and an electrolyte may be disposed between the negative and positive electrodes. The electrolyte is suitable for conducting lithium ions and, like the two electrodes, may be in solid and/or liquid form.

All-solid-state batteries, including solid-state electrolytes suitable for conducting lithium ions between solid-state positive and negative electrodes while also physically separating the positive and negative electrodes, offer several advantages compared to conventional liquid-state batteries. For example, all-solid-state batteries are made with solid-state electrolytes which are generally non-volatile and non-flammable so to allow the all-solid-state batteries to be cycled under harsher conditions than liquid-state batteries with diminished potential for thermal runaway. All-solid-state batteries may thus also have further advantages, such as operation without thermal management systems, long shelf life with zero self-discharge, and a reduced need for packaging. However, all-solid-state batteries may have comparatively low energy density levels (e.g., about 230 Wh/kg for a graphite/NMC622 solid-state battery) because of void spaces between solid-state electroactive material particles not being filled by, for example, a liquid electrolyte, or an inflexibility in accommodating various stresses and strains within the battery.

As such, it may be desirable to incorporate high-capacity electrode materials such as silicon and/or sulfur to account for the comparatively low energy densities associated with all-solid-state batteries. However, the high-capacity electrode materials may present other challenges. For example, large volume changes, including volume expansion and contraction, of high-capacity electrode materials comprising silicon during lithiation and/or delithiation can potentially result in physical damage to the solid-state components that tend to be inflexible, including wrinkling, fracture, cracking, and delamination of the stacked layers forming the all-solid-state batteries. Accordingly, it would be desirable to develop high-performance electrode materials for robust, high-energy-density all-solid-state batteries.

SUMMARY

This section provides a general summary of the disclosure, and is not a comprehensive disclosure of its full scope or all of its features.

The present disclosure relates to low expansion electrodes for solid-state lithium ion batteries.

In various aspects, the present disclosure provides a composite electrode for use in an all-solid-state electrochemical cell that cycles lithium ions. The composite electrode includes a solid-state electroactive material and a solid-state electrolyte. The solid-state electroactive material includes a plurality of particles that undergoes volumetric expansion and contraction during cycling of the electrochemical cell. Each particle of the plurality of particles has a plurality of internal pores formed therein. The composite electrode has an average interparticle porosity between respective particles of the plurality of particles of the solid-state electroactive material and the solid-state electrolyte ranging from greater than or equal to about 0% to less than or equal to about 40%. The plurality of internal pores of the solid-state electroactive material accommodate the volumetric expansion and contraction of the solid-state electroactive material inwardly so to minimize outward expansion of the plurality of particles and together with the interparticle porosity minimizes micro-cracking of the composite electrode.

In one aspect, the solid-state electroactive material includes silicon and each particle of the plurality of particles has an average porosity that ranges from greater than or equal to about 10% to less than or equal to about 75%.

In one aspect, the solid-state electroactive material includes one or more of the following: (i) silicon oxide ($SiO_2$), where each solid-state electroactive material particle has an average porosity ranging from greater than or equal to about 10% to less than or equal to about 60%; (ii) sulfur (S), where each solid-state electroactive material particle has an average porosity ranging from greater than or equal to about 10% to less than or equal to about 45%; and ferrous disulfide ($FeS_2$), where each solid-state electroactive material has an average porosity ranging from greater than or equal to about 10% to less than or equal to about 60%.

In one aspect, each particle of the plurality of particles has a honeycomb-like structure.

In one aspect, each particle of the plurality of particles has a round structure.

In one aspect, the solid-state electrolyte is from the group consisting of: $Li_{10}MP_2S_{12}$ (where M is selected from silicon (Si), tin (Sn), and germanium (Ge)), $(Li_2S)_x(MS_2)_y(P_2S_5)_{100-x-y}$ (where M is selected from silicon (Si), tin (Sn), and germanium (Ge) and where 40≤x≤85, 0≤y≤40, and 100−x−y>0), polyethylene oxide (PEO), polyacrylonitrile (PAN), lithium lanthanum titanate ($Li_{0.67-x}La_{3x}TiO_3$) (LLTO), lithium lanthanum zirconium oxide ($Li_7La_3Zr_2O_{12}$) (LLZO), lithium aluminum titanium phosphate ($Li_{1.3}Al_{0.3}Ti_{1.7}(PO_4)_3$) (LATP), oxide glass, and combinations thereof.

In one aspect, if the solid-state electrolyte includes $Li_{10}MP_2S_{12}$, the solid-state electrolyte further includes one or more dopants selected from the group consisting of lithium chloride (LiCl), lithium iodide (LiI), and combinations thereof.

In one aspect, if the solid-state electrolyte includes polyethylene oxide (PEO), the solid-state electrolyte further includes one or more salts selected from the group consisting of lithium perchlorate ($LiClO_4$), lithium hexafluorophosphate ($LiPF_6$), lithium bis(trifluoromethanesulfonyl)imide (LiTFSI), lithium bis(fluorosulfonyl)imide (LiFSI) and combinations thereof.

In one aspect, if the solid-state electrolyte includes polyacrylonitrile (PAN), the solid-state electrolyte further includes one or more salts selected from the group consisting of lithium perchlorate ($LiCO_4$), lithium hexafluorophosphate ($LiPF_6$), lithium bis(trifluoromethanesulfonyl)imide (LiTFSI), lithium bis(fluorosulfonyl)imide (LiFSI) and combinations thereof.

In one aspect, the composite electrode includes greater than or equal to about 30 wt. % to less than or equal to about 90 wt. % of the solid-state electroactive material, and greater than or equal to about 10 wt. % to less than or equal to about 70 wt. % of the solid-state electrolyte.

In one aspect, the composite electrode further includes at least one of: a conductive additive selected from the group consisting of: graphite, carbon-based materials, powdered nickel, conductive metal particles, conductive polymers, and combinations thereof; a binder selected from the group consisting of: polyvinylidene difluoride (PVdF), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof; and a reinforcing filler selected from the group consisting of: silica-based glass fibers, alumina fibers, boron nitride fibers, thermoplastic polymer fibers, and combinations thereof.

In one aspect, the composite electrode includes greater than or equal to about 0 wt. % to less than or equal to about 25 wt. % of the conductive additive; greater than or equal to about 0 wt. % to less than or equal to about 20 wt. % of the binder; and greater than or equal to about 0 wt. % to less than or equal to about 40 wt. % of reinforcing filler.

In various other aspects, the present disclosure provides an all-solid-state electrochemical cell that cycles lithium ions. The all-solid-state electrochemical cell includes a first solid-state electrode, a second solid-state electrode opposing the first solid-state electrode, and a separator disposed between the first solid-state electrode and the second solid-state electrode. The first solid-state electrode includes a solid-state electroactive material and a solid-state electrolyte. The solid-state electroactive material is in the form of a plurality of particles that undergoes volumetric expansion and contraction during cycling of the electrochemical cell. Each particle of the plurality of particles includes a plurality of intraparticle pores. Each particle of the plurality of particles may have an average porosity ranging from greater than or equal to about 10% to less than or equal to about 75%. The intraparticle pores of the solid-state electroactive material accommodate the volumetric expansion and contraction of the solid-state electroactive material inwardly so to minimize outward expansion of the plurality of particles in the first solid-state electrode. The first solid-state electrode has an average interparticle porosity between respective particles of the plurality of particles of the solid-state electroactive material and the solid-state electrolyte ranging from greater than or equal to about 0% to less than or equal to about 40%. The interparticle porosity together with the internal pores of the solid-state electroactive material minimizes micro-cracking and delamination within the all-solid-state electrochemical cell.

In one aspect, the solid-state electroactive material may be a first solid-state electroactive material that is selected from the group consisting of: silicon (Si), silicon dioxide ($SiO_2$), tin (Sn), ferrous disulfide ($FeS_2$), ferrous sulfide ($Fe_{1-x}S$, where $0 \leq x \leq 0.2$), one or more carbon lithium hosts, and combinations thereof; and the second solid-state electrode may include a second solid-state electroactive material that is selected from the group consisting of: nickel manganese cobalt oxide (NMC), lithium manganese nickel metal oxide (LMNO), lithium manganese oxide ($LiMn_2O_4$) (LMO), lithium iron phosphate ($LiFePO_4$) (LFP), and combinations thereof.

In one aspect, the solid-state electroactive material may be a first solid-state electroactive material that is selected from the group consisting of: sulfur (S), ferrous sulfide ($FeS_2$), ferrous fluoride ($FeF_2$), and combinations thereof; and the second solid-state electrode may include a second solid-state electroactive material that includes lithium metal.

In one aspect, the solid-state electroactive material is a first solid-state electroactive material and the solid-state electrolyte is a first solid-state electrolyte, and the second electrode comprises a second solid-state electroactive material and a second solid-state electrolyte.

In one aspect, the separator is formed by one of the first and second solid-state electrolytes.

In one aspect, the plurality of particles is a plurality of first particles and the second solid-state electroactive material is in the form of a plurality of second particles and each particle of the plurality of second particles has an average porosity ranging from greater than or equal to about 10% to less than or equal to about 75%.

In one aspect, the first solid-state electroactive material is selected from the group consisting of: sulfur (S), ferrous sulfide ($FeS_2$), ferrous fluoride ($FeF_2$), and combinations thereof, and the second solid-state electroactive material is selected from the group consisting of silicon, silicon dioxide ($SiO_2$), tin (Sn), ferrous disulfide ($FeS_2$), ferrous sulfide ($Fe_{1-x}S$, where $0 \leq x \leq 0.2$), one or more carbon lithium hosts, and combinations thereof.

In one aspect, the first solid-state electroactive material is sulfur and each first particle has a porosity ranging from greater than or equal to about 10 wt. % to less than or equal to about 45 wt. %.

In one aspect, the separator is formed from a solid-state electrolyte selected from the group consisting of: $Li_{10}MP_2S_{12}$ (where M is selected from silicon (Si), tin (Sn), and germanium (Ge)), $(Li_2S)_x(MS_2)_y(P_2S_5)_{100-x-y}$ (where M is selected from silicon (Si), tin (Sn), and germanium (Ge) and where $40 \leq x \leq 90$, $0 \leq y \leq 40$, and $100-x-y>0$), polyethylene oxide (PEO), polyacrylonitrile (PAN), lithium lanthanum titanate ($Li_{0.67-x}La_{3x}TiO_3$) (LLTO), lithium lanthanum zirconium oxide ($Li_7La_3Zr_2O_{12}$) (LLZO), lithium aluminum titanium phosphate ($Li_{1.3}Al_{0.3}Ti_{1.7}(PO_4)_3$) (LATP), oxide glass, and combinations thereof.

In one aspect, if the solid-state electrolyte includes $Li_{10}MP_2S_{12}$, the solid-state electrolyte further includes one or more dopants selected from the group consisting of lithium chloride (LiCl), lithium iodide (LiI), and combinations thereof.

In one aspect, if the solid-state electrolyte includes polyethylene oxide (PEO), the solid-state electrolyte further includes one or more salts selected from the group consisting of lithium perchlorate ($LiClO_4$), lithium hexafluorophosphate ($LiPF_6$), lithium bis(trifluoromethanesulfonyl)imide (LiTFSI), lithium bis(fluorosulfonyl)imide (LiFSI) and combinations thereof.

In one aspect, if the solid-state electrolyte includes polyacrylonitrile (PAN), the solid-state electrolyte further includes one or more salts selected from the group consisting of lithium perchlorate (LiClO$_4$), lithium hexafluorophosphate (LiPF$_6$), lithium bis(trifluoromethanesulfonyl)imide (LiTFSI), lithium bis(fluorosulfonyl)imide (LiFSI) and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
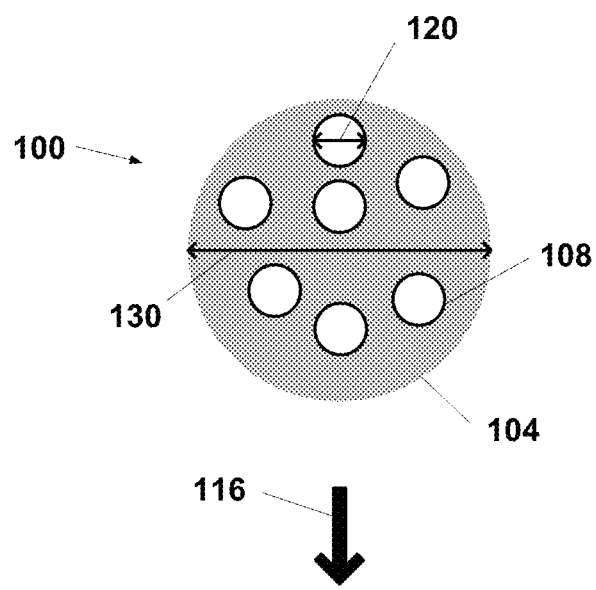
FIG. 2A is an illustration of a high-energy density electroactive particle comprising an electroactive material that undergoes volumetric expansion and contraction during lithiation and delithiation and that has a plurality of pores formed therewithin, prior to the volumetric expansion of the electroactive material.
Figure 2B:
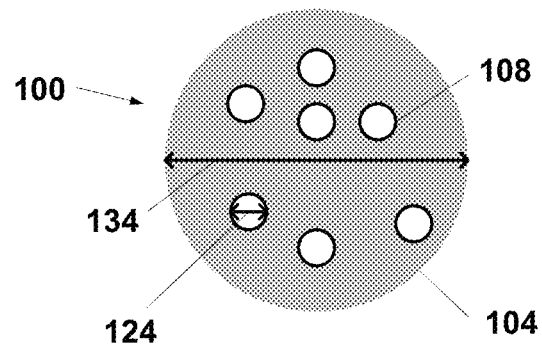
Figure 3:
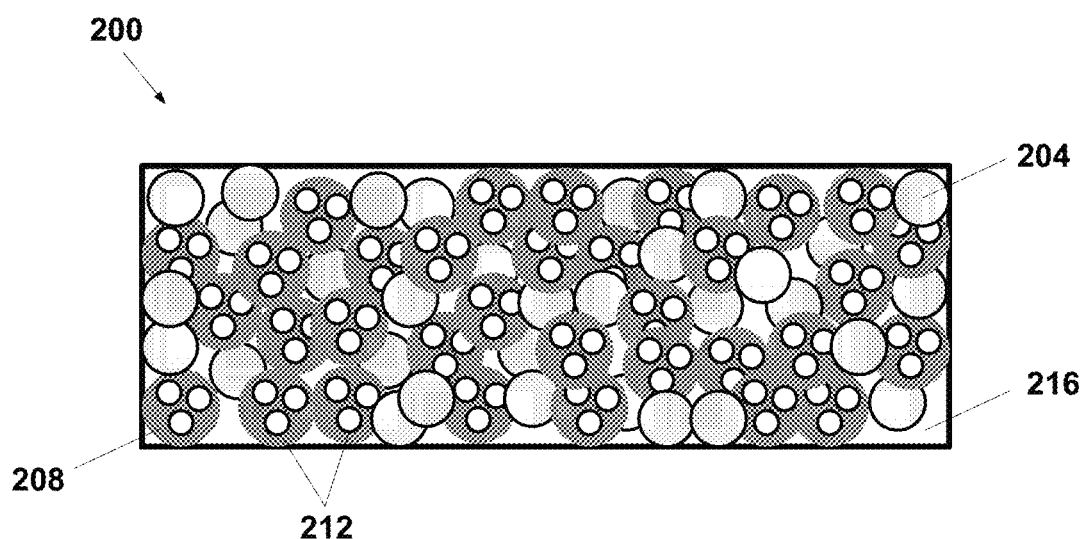

FIG. 2B is an illustration of a high-energy density electroactive particle comprising an electroactive material that undergoes volumetric expansion and contraction during lithiation and delithiation and that has a plurality of pores formed therewithin, following the volumetric expansion of the electroactive material; and FIG. 3 is an illustration of a composite electrode including the high-energy density electroactive particles shown in FIGS. 2A and 2B and a solid-state electrolyte.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
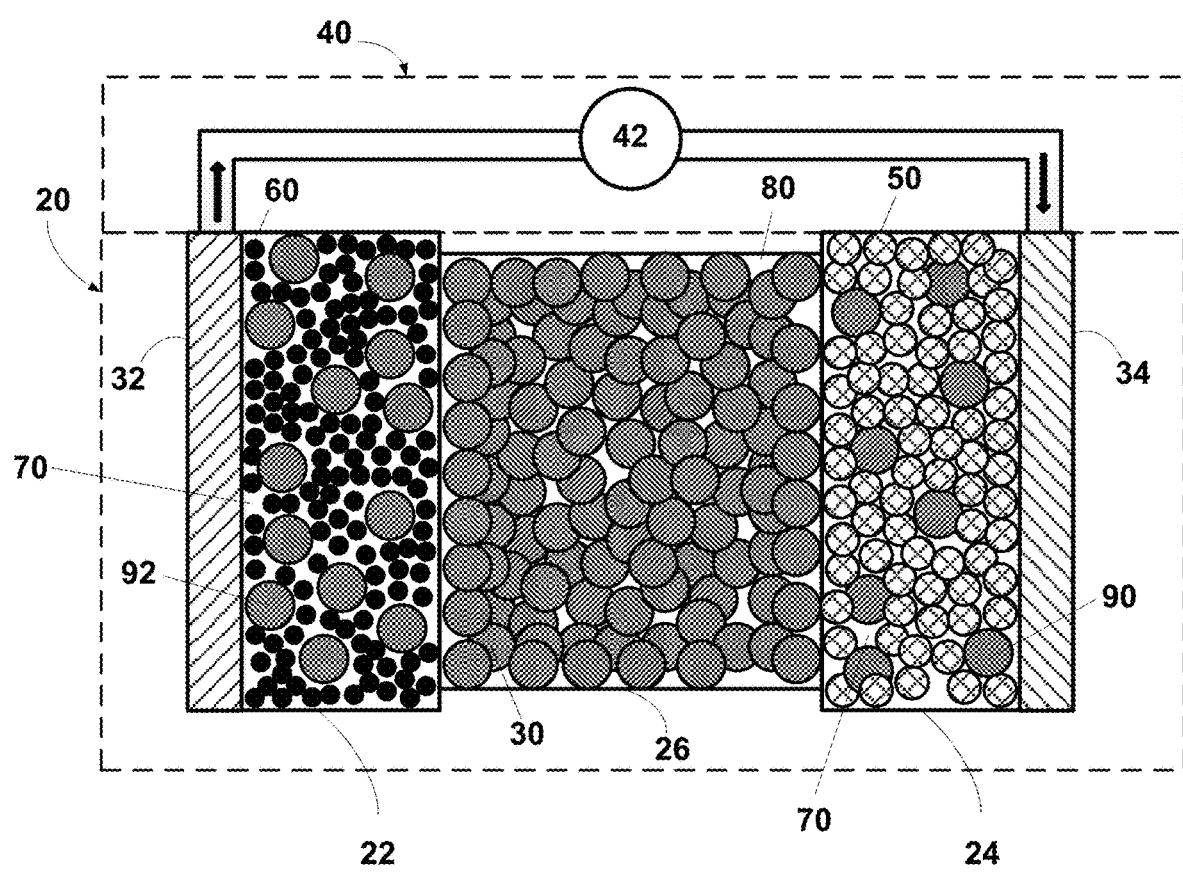
FIG. 1 is a schematic of an example of an all-solid-state electrochemical battery cell.

An exemplary and schematic illustration of an all-solid-state electrochemical cell (also referred to as the battery) that cycles lithium ions is shown in FIG. 1. The battery 20 includes a negative electrode 22, a positive electrode 24, and a separator 26 disposed between the electrodes 22, 24 and that may be formed by a solid-state electrolyte 30. The solid-state electrolyte 30 may also be present in the negative electrode 22 and the positive electrode 24. A negative electrode current collector 32 may be positioned at or near the negative electrode 22, and a positive electrode current collector 34 may be positioned at or near the positive electrode 24. The negative electrode current collector 32 and the positive electrode current collector 34 respectively collect and move free electrons to and from an external circuit 40. An interruptible external circuit 40 and load device 42 connect the negative electrode 22 (through the negative electrode current collector 32) and the positive electrode 24 (through the positive electrode current collector 34).

In solid-state batteries, the separator 26 can be defined by or formed from the solid-state electrolyte 30 and can operate as both an electrical insulator and a separator. The separator 26 is defined between the negative electrode 22 and the positive electrode 24, so as to provide electrical separation and prevent physical contact between the negative and positive electrodes 22, 24 and the occurrence of a short circuit that may result from such physical contact. The separator 26, in addition to providing a physical barrier between the negative and positive electrodes 22, 24, also provides a minimal resistance path for internal passage of lithium ions (and, in certain instances, related anions) during cycling of the lithium ions to facilitate functioning of the battery 20.

The battery 20 can generate an electric current during discharge by way of reversible electrochemical reactions that occur when the external circuit 40 is closed (to connect the negative electrode 22 and the positive electrode 24) and the negative electrode 22 contains a relatively greater quantity of lithium. The chemical potential difference between the positive electrode 24 and the negative electrode 22 drives electrons produced at the negative electrode 22 through the external circuit 40 towards the positive electrode 24. Lithium ions, which are also produced at the negative electrode 22, are concurrently transferred through the separator 26 towards the positive electrode 24. The electrons flow through the external circuit 40 and the lithium ions migrate across the separator 26 to the positive electrode 24, where they may be plated, reacted, or intercalated. The electric current passing through the external circuit 40 can be harnessed and directed through the load device 42 until the lithium in the negative electrode 22 is depleted and the capacity of the battery 20 is diminished. In lithium-ion batteries, lithium intercalates and/or alloys in the electroactive materials. In lithium-sulfur batteries, instead of intercalating or alloying, the lithium dissolves from the negative electrode and migrates to the positive electrode where it reacts/plates during discharge, while during charging, lithium plates on the negative electrode 22.

The battery 20 can be charged or re-energized at any time by connecting an external power source to the battery 20 to reverse the electrochemical reactions that occur during battery discharge. The connection of the external power source to the battery 20 compels the production of electrons and release of lithium ions from the positive electrode 24. The electrons, which flow back towards the negative electrode 22, reunite at the negative electrode 22 and replenish it with lithium for consumption during the next battery discharge cycle. As such, each discharge and charge event is considered to be a cycle, where lithium ions are cycled between the negative and positive electrodes 22, 24.

The external power source that may be used to charge the battery 20 may vary depending on size, construction, and particular end-use of the battery 20. Some notable and exemplary external power sources include an AC wall outlet and a motor vehicle alternator. In many lithium-ion battery configurations, each of the negative current collector 32, the negative electrode 22, the separator 26, the positive electrode 24, and the positive current collector 34 are prepared as relatively thin layers (e.g., from several microns to a millimeter or less in thickness) and assembled in layers connected in electrical parallel arrangement to provide a suitable electrical energy and power package.

Further, in certain aspects, the battery 20 can include a variety of other components that, while not depicted here, are nonetheless known to those of skill in the art. For instance, the battery 20 may include a casing, gasket, terminal caps, tabs, battery terminals, and any other conventional components or materials that may be situated within the battery 20, including between or around the negative electrode 22, the positive electrode 24, and/or the separator 25. As noted above, the size and shape of the battery 20 may vary depending on the particular applications for which it is designed. Battery-powered vehicles and hand-held consumer electronic devices are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, in various instances, the solid-state electrolyte separator 26 may be defined by or formed from a ceramic material, glass material, polymeric material, or any combination thereof. For example, in various variations, the separator 26 may be in the form of a layer comprising one or more of a polymeric electrolyte, a ceramic electrolyte, or a glass electrolyte. Such materials may be in particle form. In certain variations, the electrolyte separator 26 may be a composite that comprises the polymer electrolyte, the ceramic electrolyte, the glass electrolyte, or combinations thereof. The electrolyte separator 26 may have a thickness ranging from greater than or equal to about 1 μm to less than or equal to about 1 mm, and in certain aspects, optionally from greater than or equal to about 5 μm to less than or equal to about 100 μm. The electrolyte separator 26 may be formed by a casting method, hot pressing, cold pressing, physical deposition, or a combination of these methods. An interparticle porosity 80 between the solid-state electrolyte particles 30 forming the electrolyte separator 26 may be influenced by the forming method. In certain instances, the separator 26 may have an interparticle porosity 80 ranging from greater than or equal to about 0 vol. % to less than or equal to about 40 vol. %, optionally from greater than or equal to about 5 vol. % to less than or equal to about 40 vol. %, optionally from greater than or equal to about 5 vol. % to less than or equal to about 30 vol. %, and in certain aspects, optionally from greater than or equal to about 5 vol. % to less than or equal to about 20 vol. %.

In certain aspects, the ceramic material includes, for example, an oxide-based ceramic or sulfide or oxy-sulfide glass or glass-ceramic. In certain aspects, the sulfide and oxy-sulfide glasses may be formed by combining one or more glass formers and one or more glass modifiers, and in certain instances, an optional dopant. For a sulfide glass, both the glass former and the glass modifier include sulfur. An oxy-sulfide glass can include one of (i) an oxide forming system (e.g., an oxide-containing glass former and an oxide-containing glass modifier) with a sulfide co-former and (ii) a sulfide forming system (e.g., a sulfide-containing glass former and a sulfide-containing glass modifier) with an oxide co-former. The respective glass formers and the glass modifiers can react to form a sulfide or oxy-sulfide glass that enables the formation of mobile alkali metal cations.

The glass formers may include one or more glass-forming sulfides or oxides. In certain instances, the glass-forming sulfide may be selected from the group consisting of: phosphorous pentasulfide ($P_2S_5$), tin disulfide ($SnS_2$), germanium disulfide ($GeS_2$), boron sulfide ($B_2S_3$), silicon disulfide ($SiS_2$), arsenic trisulfide ($As_2S_3$), and combinations thereof. The glass-forming oxides may be selected from the group consisting of: silicon dioxide ($SiO_2$), germanium dioxide ($GeO_2$), phosphorus pentoxide ($P_2O_5$), boron trioxide ($B_2O_3$), and combinations thereof. The glass modifiers may also include one or more sulfides or oxides. In certain instances, the sulfide-containing glass modifier may be selected from the group consisting of: lithium sulfide ($Li_2S$), sodium sulfide ($Na_2S$), and combinations thereof. The oxide-containing glass modifier may be selected from the group consisting of: lithium oxide ($Li_2O$), sodium oxide ($Na_2O$), and combinations thereof. To support advantageous electrolytic activity, at least one of the glass former and the glass modifier may contain sulfur. The optional dopant may be included to improve glass formability and/or stability. The optional dopant may be selected from the group consisting of: lithium chloride (LiCl), lithium iodide (LiI), lithium metasilicate ($Li_2SiO_3$), lithium phosphate ($Li_3PO_4$), lithium orthosilicate ($Li_4SiO_4$), and combinations thereof.

In various variations, non-limiting examples of ceramic oxides include: phosphates (e.g., lithium aluminum titanium phosphate ($Li_{1.3}Al_{0.3}Ti_{1.7}(PO_4)_3$) (LATP)), perovskites (e.g., lithium lanthanum titanate ($Li_{0.67-x}La_{3x}TiO_3$) (LLTO)), and garnets (e.g., lithium lanthanum zirconium oxide ($Li_7La_3Zr_2O_{12}$) (LLZO)). A non-limiting example of a sulfide glass is lithium phosphorous sulfide (70$Li_2$S—30$P_2S_5$) (LPS). A non-limiting example of a sulfide glass-ceramic is lithium phosphorus sulfide (70$Li_2$S—30$P_2S_5$) (c-LPS) which has been devitrified to form the ionically conductive $Li_7P_3S_{11}$ crystalline phase. Polymeric materials may include solid-state polymeric electrolytes such as polyethylene oxide (PEO), by way of non-limiting example. Other inorganic materials may include anti-perovskites, complex hydrides, oxide glasses, oxysulfide glasses, and LiPON, by way of non-limiting examples. Other organic materials may include poly(methyl methacrylate) (($C_5O_2H_8)_n$) (PMMA), polyacrylonitrile (($C_3H_3N)_n$) (PAN), polyvinylidene fluoride (($C_2H_2F_2)_n$) (PVDF), and gel electrolytes (i.e., polymers plasticized with solvent) by way of non-limiting example.

The electrolyte separator 26 may further include one or more binders (not shown) and/or one or more reinforcing additives or fillers (not shown). For example, the separator 26 may include one or more binders selected from the group consisting of: polyvinylidene difluoride (PVdF), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof. In certain aspects, the electrolyte separator 26 may include greater than or equal to about 0 wt. % to less than or equal to about 20 wt. % of the one or more binders. The electrolyte separator 26 may include one or more reinforcing fillers selected from the group consisting of: silica-based glass fibers, alumina fibers, boron nitride fibers, thermoplastic polymer fibers, and combinations thereof. For example, the electrolyte separator 26 may include greater than or equal to about 0 wt. % to less than or equal to about 40 wt. % of the one or more reinforcing fillers.

The positive electrode 24 may be in a solid-state and include a lithium-based electroactive material that can undergo lithium intercalation and deintercalation, alloying and dealloying, or plating or stripping, while functioning as the positive terminal of the battery 20. The positive electrode 24 may be a composite electrode including particles of a positive electroactive material 50 admixed and formed with particles of a solid-state electrolyte 90. In certain aspects, the positive electrode 24 may include greater than or equal to about 30 wt. % to less than or equal to about 90 wt. %, and in certain aspects, optionally greater than or equal to about 40 wt. % to less than or equal to about 80 wt. % of the solid-state electroactive material 50. The positive electrode 24 may include greater than or equal to about 10 wt. % to less than or equal to about 70 wt. %, and in certain aspects, optionally greater than or equal to about 20 wt. % to less than or equal to about 60 wt. % of the solid-state electrolyte 90.

The solid-state electrolyte 90 combined with the positive electroactive material 50 that forms the positive electrode 24 may be the same or different from the solid-state electrolyte 30 that forms the separator 26. For example, in certain aspects, the solid-state electrolyte 90 may include a ceramic material such as $Li_{10}MP_2S_{12}$ ceramic, where M is selected from silicon (Si), tin (Sn), and germanium (Ge), with lithium chloride (LiCl) and/or lithium iodide (LiI) dopants; a glass material such as $(Li_2S)_x(MS_2)_y(P_2S_5)_{100-x-y}$, here M is selected from silicon (Si), tin (Sn), and germanium (Ge) and where 40≤x≤85, 0≤y≤40, and 100−x−y>0; a polymeric material such as polyethylene oxide (PEO) and/or polyacrylonitrile (PAN) with one or more salts selected from lithium perchlorate (LiClO$_4$), lithium hexafluorophosphate (LiPF$_6$), lithium bis(trifluoromethanesulfonyl)imide (LiTFSI), lithium bis(fluorosulfonyl)imide (LiFSI) and combinations thereof; a perovskites-type ceramic such as lithium lanthanum titanate (Li$_{0.67-x}$La$_{3x}$TiO$_3$) (LLTO); a garnet ceramic such as lithium lanthanum zirconium oxide (Li$_7$La$_3$Zr$_2$O$_{12}$) (LLZO); a phosphate ceramic such as lithium aluminum titanium phosphate (Li$_{1.3}$Al$_{0.3}$Ti$_{1.7}$(PO$_4$)$_3$) (LATP); and/or oxide glass.

The positive electrode 24 may include an electroactive material 50 comprising one or more metals selected from the group consisting of manganese (Mn), nickel (Ni), cobalt (Co), chromium (Cr), iron (Fe), vanadium (V), and combinations thereof. For example, in certain aspects, the positive electrode 24 may include an electroactive material 50 that includes manganese, such as lithium manganese oxide (Li$_{(1+x)}$Mn$_{(2-x)}$O$_4$)(LMO) or a mixed lithium manganese nickel oxide (LiMn$_{(2-x)}$Ni$_x$O$_4$) (LMNO), where 0≤x≤1, or a lithium manganese nickel cobalt oxide (e.g., LiMn$_{0.33}$Ni$_{0.33}$Co$_{0.33}$O$_2$)(NMC). Other known lithium-transition metal compounds such as lithium iron phosphate (LiFePO$_4$) can also be used. In a lithium-sulfur battery, the positive electrode 24 may have elemental sulfur (S) as the electroactive material 50 or a sulfur-containing active material.

The negative electrode 22 may be in a solid state, for example, it may be a composite electrode including an electroactive material 60 as a lithium host material capable of functioning as a negative terminal of a lithium-ion battery admixed and formed with particles of the solid-state electrolyte 92. In certain aspects the negative electrode 22 may include greater than or equal to about 30 wt. % to less than or equal to about 90 wt. %, and in certain aspects, optionally greater than or equal to about 40 wt. % to less than or equal to about 80 wt. % of the solid-state electroactive material 60. The negative electrode 22 may include greater than or equal to about 10 wt. % to less than or equal to about 70 wt. %, and in certain aspects, optionally greater than or equal to about 20 wt. % to less than or equal to about 60 wt. % of the solid-state electrolyte 92.

The solid-state electrolyte 92 combined with the negative electroactive material 60 forms the negative electrode 22, which may be the same or different from the solid-state electrolyte 30 that forms the separator 26 and/or the solid-state electrolyte 90 that forms the positive electrode 24. For example, in certain aspects, the solid-state electrolyte 92 may be a glass material such as (Li$_2$S)$_x$(P$_2$S$_5$)$_{100-x-y}$(P$_2$O$_5$)$_y$, where 50≤x≤85, 0≤y≤20, and 100−x−y>0, with lithium chloride (LiCl), lithium iodide (LiI), lithium metasilicate (Li$_2$SiO$_3$), and/or lithium phosphate (Li$_3$PO$_4$) dopants; a ceramic such as Li$_7$P$_3$S$_{11-x}$O$_x$, where 0≤x≤5; a polymeric material such as polyethylene oxide (PEO), polyacrylonitrile (PAN), and/or polyvinylidene fluoride ((C$_2$H$_2$F$_2$)$_n$) (PVDF) with one or more salts selected from lithium perchlorate (LiClO$_4$), lithium hexafluorophosphate (LiPF$_6$), lithium bis(trifluoromethanesulfonyl)imide (LiTFSI), lithium bis(fluorosulfonyl)imide (LiFSI) and combinations thereof; a perovskites-type ceramic such as lithium lanthanum titanate (Li$_{0.67-x}$La$_{3x}$TiO$_3$) (LLTO); a garnet ceramic such as lithium lanthanum zirconium oxide (Li$_7$La$_3$Zr$_2$O$_{12}$) (LLZO); a phosphate ceramic such as lithium aluminum titanium phosphate (Li$_{1.3}$Al$_{0.3}$Ti$_{1.7}$(PO$_4$)$_3$) (LATP); and/or oxide glass.

In certain aspects, the solid-state electrolyte (e.g., 30, 90, and 92) in any of the positive electrode 24, the negative electrode 22, and/or the separator 26 may reversibly compress during lithium cycling. For example, ceramic-based solid-state electrolytes may accommodate a compressive elastic volumetric strain (dV/V) ranging from greater than or equal to about 0 vol. % to less than or equal to about 5 vol. %, and in certain aspects, optionally from greater than or equal to about 0 vol. % to less than or equal to about 1 vol. %. Polymeric-based solid-state electrolytes may accommodate a compressive elastic volumetric strain ranging from greater than or equal to about 0 vol. % to less than or equal to about 20 vol. %, and in certain aspects, optionally from greater than or equal to about 0 vol. % to less than or equal to about 5 vol. %.

Common negative electroactive materials 60 include lithium insertion materials or alloy host materials, like carbon-based materials, such as lithium-graphite intercalation compounds, or lithium-silicon compounds, lithium-tin alloys, and lithium titanate (Li$_{4+x}$Ti$_5$O$_{12}$, where 0≤x≤3) such as Li$_4$Ti$_5$O$_{12}$ (LTO). Where the negative electrode 22 is made of metallic lithium, the electrochemical cell is considered a lithium-metal battery of cell. Metallic lithium for use in the negative electrode 22 of a rechargeable battery 20 has various potential advantages, including having the highest theoretical capacity and lowest electrochemical potential. However, in certain instances, when the negative electrode 22 is made of metallic lithium certain solid-state electrolytes, such as oxide glasses, lithium lanthanum titanate (Li$_{0.67-x}$La$_{3x}$TiO$_3$) (LLTO), lithium aluminum titanium phosphate (Li$_{1.3}$Al$_{0.3}$Ti$_{1.7}$(PO$_4$)$_3$) (LATP) and sulfide glasses containing silicon (Si), tin (Sn), and/or germanium (Ge), should not be made to make physical contact with the lithium metal. A negative electrode comprising metallic lithium may further include a non-graphitic carbon as a host for the lithium metal.

In various instances, one or both of the composite electrodes 22, 24 may further include one or more electrically conductive additives (not shown) and/or one or more binder additives (not shown) and/or one or more reinforcing additives or fillers (not shown). For example, in certain aspects, the composite electrodes 22, 24 may further include one or more electrically conductive additives selected from the group consisting of graphite, carbon-based materials, powdered nickel, conductive metal particles, or a conductive polymer. The carbon-based materials may include particles of: KETCHEN™ black, DENKA™ black, acetylene black, carbon black, and the like. Examples of the conductive polymers include polyaniline, polythiophene, polyacetylene, polypyrrole, and the like. The one or more optional binders may be selected from the group consisting of: polyvinylidene difluoride (PVdF), ethylene propylene diene monomer (EPDM) rubber, carboxymethoxyl cellulose (CMC), nitrile butadiene rubber (NBR), styrene butadiene rubber (SBR), lithium polyacrylate (LiPAA), sodium polyacrylate (NaPAA), sodium alginate, lithium alginate, and combinations thereof. The one or more reinforcing fillers included in the one or both of the composite electrodes 22, 24 may be the same or different from the reinforcing filler included in the separator 26. For example, the reinforcing filler may be selected from the group consisting of: silica-based glass fibers, alumina fibers, boron nitride fibers, thermoplastic polymer fibers, and combinations thereof.

One or both of the composite electrodes 22, 24 may include greater than or equal to about 0 wt. % to less than or equal to about 25 wt. %, optionally greater than or equal to about 0 wt. % to less than or equal to about 10 wt. %, and in certain aspects, optionally greater than or equal to about 0 wt. % to less than or equal to about 5 wt. % of the one or more electrically conductive additives. One or both of the composite electrodes 22, 24 may include greater than or equal to about 0 wt. % to less than or equal to about 20 wt. %, optionally greater than or equal to about 0 wt. % to less than or equal to about 10 wt. %, and in certain aspects, optionally greater than or equal to about 0 wt. % to less than or equal to about 5 wt. % of the one or more binders. One or both of the composite electrodes 22, 24 may include greater than or equal to about 0 wt. % to less than or equal to about 40 wt. % of the one or more reinforcing fillers.

The positive current collector 34 may be formed from aluminum or any other appropriate electrically conductive material known to those of skill in the art. The negative electrode current collector 32 may be formed from copper or any other appropriate electrically conductive material known to those of skill in the art. For example, the negative electrode current collector 32 may be a copper collector foil, which may be in the form of an open mesh grid or a thin film.

In certain aspects, one or both of the composite electrodes 22, 24 may be formed by calendaring or cold pressing a dried filmed cast via slurry coating. In such instances, the formed composite electrode may be considered as a "green" ceramic. Such composite electrodes 22, 24 formed by cold pressing and/or with binders typically have an interparticle porosity 70 defined between the solid-state electroactive material particles 50, 60 and solid-state electrolytes 90, 92 forming the composite electrodes 22, 24 (for example, first open regions or pores defined between the positive electrode solid-state electroactive material 50 and positive electrode solid-state electrolyte 90 or second open regions or pores defined between the negative electrode solid-state electroactive material 60 and negative electrode solid-state electrolyte 92). The interparticle porosity 70 in either the positive composite electrode 22 or the negative electrode 24 may range from greater than or equal to about 0 vol. % to less than or equal to about 40 vol. %, optionally from greater than or equal to about 5 vol. % to less than or equal to about 40 vol. %, optionally from greater than or equal to about 5 vol. % to less than or equal to about 30 vol. %, and in certain aspects, optionally from greater than or equal to about 5 vol. % to less than or equal to about 20 vol. %. In certain aspects, when the composite electrode comprises a sulfide glass solid-state electrolyte or a polymer electrolyte, the composite electrode may have an interparticle porosity that is less than or equal to about 20%. In other aspects, when the composite electrode comprises an oxide ceramic solid-state electrolyte, the composite electrode may have an interparticle porosity that is less than or equal to about 40%. In many instances, the composite electrode's interparticle porosity is dependent upon the pressure applied during the manufacturing process, the distribution of particles sizes, and the composition of the composite.

In certain instances, one or both of the composite electrodes 22, 24 may be subject to a further densification process. Such further densification may be desirable as a means to improve or maximize the energy density (Wh/L) of the battery. For example, in certain aspects, the densification process may include heating the composite electrode to above a glass-transition temperature of the solid-state electrolyte comprising a sulfide glass or polymeric material. At temperatures above the glass-transition temperature of the solid-state electrolyte, the solid-state electrolyte may soften and then flow into void space when pressure is applied. Following such a process, the composite electrode may have an interparticle porosity that ranges from greater than or equal to about 0 vol. % to less than or equal to about 10 vol. %, and in certain aspects, optionally, from greater than or equal to about 0 vol. % to less than or equal to about 5 vol. %. In certain instances, the densification process may include sintering the composite electrode. In such instances, the composite electrode may include a solid-state electrolyte comprising an oxide ceramic and/or sulfide glass. Sintering may involve physical aspects such as particle-particle necking, grain growth, and grain boundary growth.

As a result of the interparticle porosity, direct contact between the solid-state electroactive particles and the solid-state electrolyte may be much lower than the contact between liquid electrolyte and solid electroactive particles in non-solid-state batteries. Accordingly, all-solid-state batteries often include a much greater quantity of solid-state electrolyte compared to non-solid-state batteries, both within the composite electrodes and in the separator, resulting in comparatively thick separators. The large quantity of solid-state electrolyte results in low active material loading, translating to low energy density and power in conventional all-solid-state batteries. In certain aspects, as described above, densification of the composite electrode may improve the interface between the solid-state electrolyte and the electroactive material and reduce the necessary loading of the solid-state electrolyte.

In one example of a lithium-ion all-solid-state battery, a positive electrode has about 60% active material NMC 622 ($LiNi_{0.6}Mn_{0.2}Co_{0.2}O_2$) loading (i.e., about 60% positive electroactive material by weight, with the balance including the solid-state electrolyte and conductive additive and/or binder and/or reinforcing filler) and a negative electrode has about 40% active material graphite loading (i.e., about 40% negative electroactive material by weight, with the balance including the solid-state electrolyte and optional conductive additive and/or binder). The separator may have a thickness of about 25 μm and the solid-state electrolyte separator and the electrodes may each have an interparticle porosity of about 15%. The resulting energy density is about 227 Wh/kg.

In various aspects, the energy density of the lithium-ion all-solid-state battery with the NMC cathode may be increased by using one or more high-capacity negative electrode materials, such as silicon (Si), silicon dioxide ($SiO_2$), tin (Sn), ferrous disulfide ($FeS_2$), ferrous sulfide ($Fe_{1-x}S$, where $0 \leq x \leq 0.2$), one or more carbon lithium hosts, and combinations thereof, to form one or both of the composite electrodes. For example, in such instances, where the negative electrode has about 40% active material silicon loading the resulting energy density may be about 300 Wh/kg. In certain other aspects, the energy density of the lithium-ion all-solid-state battery may be increased by using one or more high-capacity positive electrode materials, such as sulfur (S), ferrous sulfide ($FeS_2$), ferrous fluoride ($FeF_2$), and combinations thereof. For example, in such instances, the resulting energy density may be about 300 Wh/kg. In certain instances, these high-capacity positive electrode materials may be used in conjunction with the high-capacity negative electrode materials. In such instances, the resulting energy density may be greater than about 300 Wh/kg.

However, including such high-energy density electroactive materials in one or both of the positive and negative composite electrodes can present potential challenges. Such electroactive materials often also undergo volumetric expansion and contraction during cycling of the battery. For example, silicon may undergo a volumetric expansion and contraction of greater than or equal to about 300% and silicon dioxide may undergo a volumetric expansion and contraction of greater than or equal to about 136%. Tin may undergo a volumetric expansion and contraction of greater than or equal to about 255%. Sulfur may undergo a volumetric expansion and contraction of greater than or equal to about 70% and ferrous disulfide may undergo a volumetric expansion and contraction of greater than or equal to about 159%. Ferrous fluoride may undergo a volumetric expansion and contraction of greater than or equal to about 16.9%. Such volume changes, including volume expansion and contraction, of the electroactive materials during lithiation and/or delithiation can result in physical damage to the generally inflexible solid-state components, including wrinkling, fracture, and cracking of the solid-state electrolyte and delamination between battery layers. However, in accordance with certain aspects of the present disclosure, the electroactive materials are porous. The pores of the high-energy density electroactive materials may accommodate the relating volumetric expansions and contractions. More particularly, the pores may be internal pores that inwardly accommodate the volumetric expansions and contractions to minimize outward expansion and relating stresses and/or strains on the all-solid-state battery structures.

With reference to FIG. 2A, a solid-state electroactive particle 100 according to certain aspects of the present disclosure is provided. The electroactive particle 100 comprises an electroactive material 104, such as a high-energy density electroactive material or a material that undergoes volumetric expansion and contraction during cycling of the electrochemical cell. The electroactive particle 100 also includes a plurality of internal pores 108 formed therewithin. Notably, there may also be pores disposed on or extending to the exposed surfaces of the electroactive material 104 (so that a portion of the pore extends to the external surface). However, the predominant majority of pores 108 are disposed internally within each solid-state electroactive particle 100 so to minimize outward expansion of the dimensions of the electroactive particle 100 upon volumetric expansion and contraction of the electroactive material 104 during cycling of the electrochemical cell.

In various instances, the electroactive material 104 may have an average internal or intraparticle porosity ranging from greater than or equal to about 10% to less than or equal to about 75%, optionally from greater than or equal to about 10% to less than or equal to about 60%, and in certain aspects, optionally from greater than or equal to about 10% to less than or equal to about 45%. As noted, the plurality of internal pores 108 may accommodate the volumetric expansion and contraction of the electroactive material 104 inwardly so as to minimize outward expansion of the solid-state electroactive particles 100. For example, in certain aspects, the electroactive particle 100 may have initial an average particle diameter 130 ranging from greater than or equal to about 500 nm to less than or equal to about 20 µm, and in certain aspects, optionally from greater than or equal to about 500 nm to less than or equal to about 10 µm. The internal pores 108 may have an initial average pore diameter 120 that ranges from greater than or equal to about 1 nm to less than or equal to about 10 µm, and in certain aspects, optionally from greater than or equal to about 1 nm to less than or equal to about 1 µm. Electroactive particles including internal pores having diameters ranging from greater than or equal to about 2 nm to less than or equal to about 50 nm may be defined as mesoporous. Electroactive particles including internal pores having diameters that are less than about 2 nm may be defined as microporous, and electroactive particles including internal pores having diameters that are greater than about 50 nm may be defined as macroporous.

The electroactive material 104 may be selected from the group consisting of silicon (Si), silicon dioxide ($SiO_2$), tin (Sn), sulfur (S), ferrous disulfide ($FeS_2$), ferrous fluoride ($FeF_2$), ferrous sulfide ($Fe_{1-x}S$, where $0 \leq x \leq 0.2$), one or more carbon lithium hosts, and combinations thereof and may undergo volumetric expansion and contraction during lithiation and/or delithiation. As illustrated in FIG. 2B, the internal pores 108 may accommodate the volumetric expansion of the electroactive material 104 so to eliminate or minimize outward expansion of the electroactive particle 100. Arrow 116 represents the volumetric expansion and/or contraction during lithiation and/or delithiation.

Following the lithiation of the electroactive material 104, the pore diameter 120 of the internal pores 108 may become smaller to at least partially accommodate the volume expansion of the electroactive material. In this manner, the internal pores 108 may have an initial average diameter 120 and a final average diameter 124 during lithiation. For example, in the instances of a silicon-containing electroactive material, the absolute volume change of the electroactive material may be up to about 300 vol. %. Silicon-containing electroactive materials including internal pores may have an apparent volumetric change of the electroactive material that is less than about 45 vol. %. The difference between the initial average pore diameter 120 and the final average pore diameter 124 accounts for the discrepancy between the absolute and apparent volume change. As such, because of at least in part the availability of the intraparticle porosity and the interparticle porosity, the electroactive particle 100 may have an average particle diameter 134 following lithiation that is the same as or similar to the initial average particle diameter 130. It should be noted that the features in FIG. 2A-2B are not necessarily shown to scale, but rather are merely provided for purposes of illustration. Likewise, the electroactive particles and pores are not required to have the depicted round or regular morphology.

In certain aspects, an average internal or intraparticle porosity of an electroactive particle will vary based on the selected electroactive material. For example, an electroactive particle comprising silicon as the electroactive material may have an average porosity ranging from greater than or equal to about 10% to less than or equal to about 75%, and in certain aspects, optionally from greater than or equal to about 20%, by volume of the electroactive particle. In other instances, an electroactive particle comprising silicon dioxide as the electroactive material may have an average porosity ranging from greater than or equal to about 10% to less than or equal to about 60%, and in certain aspects, optionally from greater than or equal to about 20% to less than or equal to about 40%, by volume of the electroactive particle. In still other instances, an electroactive particle comprising sulfur may have an average porosity ranging from greater than or equal to about 10% to less than or equal to about 45% by volume of the electroactive particle; and an electroactive particle comprising ferrous disulfide as the electroactive material may have an average porosity ranging from greater than or equal to about 10% to less than or equal to about 60% by volume of the electroactive particle.

In various aspects, the percent porosity of an electroactive particle may be calculated according to the following formulas:

$$\text{Electroactive Material Porosity} = \frac{V_c}{V_c + V_1} * 100$$

$$V_1 = \frac{m_1}{d_1}, V_2 = \frac{m_2}{d_2}, \ldots, V_n = \frac{m_n}{d_n}$$

$$V_a = \sum_{i=1}^{n} V_i + V_b + V_c + V_d$$

$$V_b = p_1 \times V_a$$

$$V_c = (|E_1| \times V_1) - (|E_2| \times V_2) - \sum_{i=3}^{n} (|E_i| \times V_i) - V_b - V_d$$

where $m_1$ is a total mass of a solid-state electroactive material within the composite electrode, $d_1$ is a skeletal (e.g., theoretical or crystal) particle density of the solid-state electroactive material within the composite electrode, $m_2$ is a total mass of a first solid-state electrolyte within the composite electrode, and $d_2$ is a skeletal (e.g., theoretical or crystal) particle density of the first solid-state electrolyte within the composite electrode.

In certain aspects, the composite electrode may further include additional components—for example, a second solid-state electrolyte, one or more conductive additives, one or more binders, and one or more reinforcing additives or fillers. The total number of electrode components is open ended and given by the subscript n with each additional electrode component assigned a respective mass ($m_i$) and skeletal density ($d_i$). The skeletal volume ($V_i$) of each $i^{th}$ electrode component may be calculated from its mass and skeletal density. The total volume of the composite electrode ($V_a$) is the sum of the electrode component skeletal volumes and the pore volumes. The interparticle composite pore volume ($V_b$) is calculated using the interparticle porosity of the composite electrode ($p_1$). The electroactive material intraparticle pore volume is represented by $V_c$. The other electrode components may also have intraparticle porosity and a total sum of the intraparticle pore volume of the other electrode components is represented by $V_d$.

During lithiation, the electroactive material may experience a volumetric expansion, while the other electrode components may experience a volumetric compression. Volumetric expansion and compression are also known as bulk strain ($E_i$). $E_1$ represents an expected bulk strain of the solid-state electroactive material upon lithiation. $E_2$ represents a bulk strain of the solid-state electrolyte, and $E_i$ represents the bulk strain of the $i^{th}$ component of the composite electrode. The bulk strain of the electroactive material during lithiation may be accommodated by the strain of the other electrode components, the interparticle pore volume, and the intraparticle pore volume of the other electrode components. The minimum electroactive material intraparticle pore volume may, therefore, be calculated by conservation of volume and a consideration of a zero overall bulk strain for the total composite electrode.

With reference to FIG. 3 and the aforementioned equations, a composite electrode 200 according to certain aspects of the present disclosure is provided. The composite electrode 200 comprises a solid-state electroactive material that undergoes volumetric expansion and contraction during cycling of the electrochemical cell including the composite electrode 200 and a solid-state electrolyte 204. The solid-state electroactive material may be in the form of a plurality of particles 208 and each particle 208 has a plurality of internal or intraparticle pores 212 formed therewithin. In certain aspects, each particle of the plurality of particles 208 may have a honeycomb-like structure, and in other aspects, each particle of the plurality of particles 208 may have a round structure. A round structure may include particles having relatively low aspect ratios and a morphology or shape including spherical, spheroidal, hemispherical, disk, globular, annular, toroidal, cylindrical, discoid, domical, egg-shaped, elliptical, orbed, oval, and the like. The internal pores 212 may be substantially homogeneously distributed throughout each particle 208, and in certain aspects, may have a hierarchical porosity and/or a core-shell porosity, where the porosity is the void space between the electroactive material and its shell.

In certain aspects, such as when the composite electrode 200 is formed by cold pressing, the composite electrode 200 may have an interparticle porosity or void space 216 between the solid-state electroactive particles 208 and the solid-state electrolyte particles 204. The composite electrode 200 may have an interparticle porosity ranging from greater than or equal to about 5 vol. % to less than or equal to about 40 vol. %, optionally greater than or equal to about 5 vol. % to less than or equal to about 30 vol. %, optionally greater than or equal to about 5 vol. % to less than or equal to about 20 vol. %, and in certain aspects, optionally greater than or equal to about 5 vol. % to less than or equal to about 15 vol. %. In certain aspects, such as when the composite electrode 200 is further formed by a densification process, the composite electrode 200 may have an interparticle porosity ranging from greater than or equal to about 0 vol. % to less than or equal to about 40 vol. %.

Such interparticle porosity 216 may partially accommodate volumetric expansion and contraction of the solid-state electroactive material. When the solid-state electroactive material has a low expansion (e.g., $E_1 \times V_1 \ll V_b$), the interparticle composite pore volume ($V_b$) may be sufficient to accommodate volumetric expansion of the solid-state electroactive material ($E_1$). In such instances, the solid-state electroactive material particles may have a porosity ($V_c$) that is about 0%. For example, the interparticle composite pore volume ($V_b$) may be sufficient to accommodate volumetric expansion of the solid-state electroactive material ($E_1$) when the positive solid-state electroactive material is selected from NMC 622 ($LiNi_{0.6}Mn_{0.2}Co_{0.2}O_2$), lithium manganese oxide ($LiMn_2O_2$) (LMO), and/or $LiFePO_4$ (LFP) and/or the negative solid-state electroactive material is selected from graphite and/or $Li_4Ti_5O_{12}$ (LTO). Further, in such instances, the compressive strain of the solid-state electrolyte ($E_2$), along with other composite components, such as binders, electrically conductive additives, and reinforcing fillers, may also accommodate the volumetric expansion of the solid-state electroactive material ($E_1$). The strain may be sufficiently small so to have no adverse impact on the observed performance of the electrochemical cell.

When high expansion solid-state electroactive materials with inadequate intraparticle porosity ($V_c$) are lithiated, the interparticle composite pore volume ($V_b$) may not be sufficient to accommodate the volumetric expansion of the solid-state electroactive material ($E_1$). In certain aspects, high expansion solid-state electroactive materials may impart such large stresses on other composite electrode components that irreparable damage may occur in the composite electrode structure. For example, brittle solid-state electrolytes, such as glasses and ceramics, may fracture under appropriately high loads and polymeric solid-state electrolytes may plastically yield under appropriately high loads. Cracking and plastic yielding are irreversible processes that may result in a loss of contact between solid-state electrolyte particles and the electroactive particles. Loss of electrode-electrolyte contact area within the composite electrode may result in a degradation of battery performance that manifests as a loss in capacity and power.

As depicted in FIG. 3, a plurality of intraparticle pores 212 may be incorporated into the electroactive material particles. The intraparticle or internal pores 212 accommodate the volumetric expansion and contraction of the solid-state electroactive material inwardly so as to minimize outward expansion of the particles and thereby minimize the stress imparted on the solid-state electrolyte particles to prevent or mitigate failure related to micro-cracking within the composite electrode 200. Intraparticle porosity 212 may be particularly important in instances where the composite electrodes have been densified by hot pressing and/or sintering and there is little interparticle porosity available to accommodate electroactive material strain.

With renewed reference to FIG. 1, in certain aspects, one or both of the composite electrodes 22, 24 may include a high-energy density electroactive material that undergoes volumetric expansion and contraction during cycling of the battery 20. For example, the positive electrode 24 may comprise a positive electroactive material 50 selected from the group consisting of: sulfur, ferrous disulfide, ferrous fluoride, and combinations thereof. In various instances, the negative electrode 22 may comprise a negative electroactive material 60 selected from the group consisting of: silicon, silicon dioxide, tin, and combinations thereof. In such instances, as described with respect to FIGS. 2A-2B and 3, the respective electroactive material is in the form of a plurality of particles and each particle includes a plurality of pores formed therewithin. The volume expansion of the active material may be accommodated by the interparticle pore volume ($V_b$), the intraparticle pore volume of the electroactive material ($V_c$), and the strain of the solid-state electrolyte ($E_2$).

As noted above, there are several benefits to the use of all-solid-state batteries, including long shelf lives with minimal to no self-discharge because many solid-state electrolytes are pure ionic conductors. Further, all-solid-state batteries can generally be cycled under harsher conditions than typical lithium-ion batteries without concern for thermal runaway because the solid-state electrolytes are usually non-volatile and non-flammable. As such, thermal management systems can be eliminated or de-rated. Additionally, all-solid-state batteries may be resistant to puncture and mechanical abuse such to reduce packaging requirements. The incorporation of the high-energy density electroactive material and mitigation of relating volumetric expansion and contraction via the introduction of pores offers further benefits to the use of all-solid-state batteries. For example, the introduction of pores into the high-energy density electroactive material improves the energy density of all-solid-state batteries while minimizing micro-cracking and delamination within the all-solid-state electrochemical cell and reducing the stack pressure necessary for lamination of the layers comprising the all-solid-state electrochemical cell. For example, all-solid-state batteries in accordance with certain aspects of the present disclosure may have an energy density ranging from greater than or equal to about 133 Wh/kg to less than or equal to about 350 Wh/kg. The use of intraparticle porosity may also reduce the stack pressure requirement on all-solid-state battery packs. Solid-state batteries may require stack pressures that are in excess of about 100 psi. Applying such a pressure may require the addition of heavy structural components to the battery pack causing a reduction in the pack-level energy density. Therefore, reducing the required stack pressure may allow for the elimination or de-rating of these structure components so to further improve pack-level density.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A composite electrode for use in an all-solid-state electrochemical cell that cycles lithium ions, the composite electrode comprising:
   a solid-state electroactive material in the form of a plurality of solid-state electroactive material particles that undergoes volumetric expansion and contraction during cycling of the electrochemical cell,
      wherein each solid-state electroactive material particle of the plurality of solid-state electroactive particles comprises a plurality of internal pores formed therein; and
   a solid-state electrolyte in the form of a plurality of solid-state electrolyte particles that are intermingled with and contacting the solid-state electroactive material,
      wherein the composite electrode has an interparticle porosity between the solid-state electroactive material particles and the solid-state electrolyte particles ranging from greater than 0% to less than or equal to about 40%,
      wherein the plurality of internal pores of the solid-state electroactive material particles accommodate the volumetric expansion and contraction of the solid-state electroactive material inwardly so to minimize outward expansion of the solid-state electroactive material particles, and
      wherein the internal pores of the solid-state electroactive material particles together with the interparticle porosity minimizes micro-cracking of the composite electrode.

2. The composite electrode of claim 1, wherein the solid-state electroactive material comprises silicon and each solid-state electroactive material particle has an average porosity ranging from greater than or equal to about 10% to less than or equal to about 75%.

3. The composite electrode of claim 1, wherein the solid-state electroactive material comprises one or more of the following:
   (i) silicon oxide ($SiO_2$), wherein each solid-state electroactive material particle has an average porosity ranging from greater than or equal to about 10% to less than or equal to about 60%;
   (ii) sulfur (S), wherein each solid-state electroactive material particle has an average porosity ranging from greater than or equal to about 10% to less than or equal to about 45%; and
   (iii) ferrous disulfide ($FeS_2$), wherein each solid-state electroactive material has an average porosity ranging from greater than or equal to about 10% to less than or equal to about 60%.

4. The composite electrode of claim 1, wherein each solid-state electroactive material particle has a honeycomb-like structure.

5. The composite electrode of claim 1, wherein each solid-state electroactive material particle has a round structure.

6. The composite electrode of claim 1, wherein the solid-state electrolyte is selected from the group consisting of: $Li_{10}MP_2S_{12}$ (where M is selected from silicon (Si), tin (Sn), and germanium (Ge)), $(Li_2S)_x(MS_2)_y(P_2S_5)_{100-x-y}$ (where M is selected from silicon (Si), tin (Sn), and germanium (Ge) and where $40 \leq x \leq 85$, $0 \leq y \leq 40$, and $100-x-y>0$), polyethylene oxide (PEO), polyacrylonitrile (PAN), lithium lanthanum titanate $(Li_{0.67-x}La_xTiO_3)$ (LLTO), lithium lanthanum zirconium oxide $(Li_7La_3Zr_2O_{12})$ (LLZO), lithium aluminum titanium phosphate $(Li_{1.3}Al_{0.3}Ti_{1.7}(PO_4)_3)$ (LATP), oxide glass, and combinations thereof.

7. The composite electrode of claim 6, wherein the solid-state electrolyte further comprises one or more dopants selected from the group consisting of lithium chloride (LiCl), lithium iodide (LiI), and combinations thereof, or
one or more salts selected from the group consisting of lithium perchlorate ($LiClO_4$), lithium hexafluorophosphate ($LiPF_6$), lithium bis(trifluoromethanesulfonyl)imide (LiTFSI), lithium bis(fluorosulfonyl)imide (LiFSI) and combinations thereof.

8. The composite electrode of claim 1, wherein the composite electrode comprises:
greater than or equal to about 30 wt. % to less than or equal to about 90 wt. % of the solid-state electroactive material, and
greater than or equal to about 10 wt. % to less than or equal to about 70 wt. % of the solid-state electrolyte.

9. The composite electrode of claim 8, wherein the composite electrode further comprises at least one of:
a conductive additive selected from the group consisting of: graphite, carbon-based materials, powdered nickel, conductive metal particles, conductive polymers, and combinations thereof,
a binder selected from the group consisting of: polyvinylidene difluoride (PVdF), ethylene propylene diene monomer (EPDM) rubber, carboxymethoxyl cellulose (CMC), nitrile butadiene rubber (NBR), lithium polyacrylate (LiPAA), sodium polyacrylate (NaPAA), sodium alginate, lithium alginate, and combinations thereof; and
a reinforcing filler selected from the group consisting of: silica-based glass fibers, alumina fibers, boron nitride fibers, thermoplastic polymer fibers, and combinations thereof.

10. The composite electrode of claim 9, wherein the composite electrode comprises:
greater than or equal to about 0 wt. % to less than or equal to about 25 wt. % of the conductive additive;
greater than or equal to about 0 wt. % to less than or equal to about 20 wt. % of the binder; and
greater than or equal to about 0 wt. % to less than or equal to about 40 wt. % reinforcing filler.

11. An all-solid-state electrochemical cell that cycles lithium ions comprising:
a first solid-state electrode comprising:
a solid-state electroactive material in the form of a plurality of particles that undergoes volumetric expansion and contraction during cycling of the electrochemical cell,
wherein each particle of the plurality of particles comprises a plurality of intraparticle pores and has an average porosity ranging from greater than or equal to about 10% to less than or equal to about 75%, and
wherein the intraparticle pores of the solid-state electroactive material accommodate the volumetric expansion and contraction of the solid-state electroactive material inwardly so to minimize outward expansion of the plurality of particles in the first solid-state electrode; and
a solid-state electrolyte in the form of a plurality of solid-state electrolyte particles that are intermingled with and contacting the solid-state electroactive material,
wherein the first solid-state electrode has an average interparticle porosity between the solid-state electroactive material particles and the solid-state electrolyte particles ranging from greater than or equal to about 0% to less than or equal to about 40%, and
wherein the interparticle porosity together with the intraparticle pores minimize micro-cracking and delamination within the all-solid-state electrochemical cell; and
a second solid-state electrode opposing the first solid-state electrode; and
a separator disposed between the first solid-state electrode and the second solid-state electrode.

12. The all-solid-state electrochemical cell of claim 11, wherein the solid-state electroactive material is a first solid-state electroactive material selected from the group consisting of silicon (Si), silicon dioxide ($SiO_2$), tin (Sn), ferrous disulfide ($FeS_2$), ferrous sulfide ($Fe_{1-x}S$, where $0 \leq x \leq 0.2$), one or more carbon lithium hosts, and combinations thereof; and
wherein the second solid-state electrode comprises a second solid-state electroactive material selected from the group consisting of nickel manganese cobalt oxide (NMC), lithium manganese nickel metal oxide (LMNO), lithium manganese oxide ($LiMn_2O_2$) (LMO), lithium iron phosphate $LiFePO_4$ (LFP), and combinations thereof.

13. The all-solid-state electrochemical cell of claim 11, wherein the solid-state electroactive material is a first solid-state electroactive material selected from the group consisting of: sulfur (S), ferrous sulfide ($FeS_2$), ferrous fluoride ($FeF_2$), and combinations thereof; and
wherein the second solid-state electrode comprises a second solid-state electroactive material that comprises lithium metal.

14. The all-solid-state electrochemical cell of claim 11, wherein the solid-state electroactive material is a first solid-state electroactive material and the solid-state electrolyte is a first solid-state electrolyte, and
wherein the second electrode comprises a second solid-state electroactive material and a second solid-state electrolyte.

15. The all-solid-state electrochemical cell of claim 14, wherein the separator is formed by one of the first and second solid-state electrolytes.

16. The all-solid-state electrochemical cell of claim 14, wherein the plurality of solid-state electroactive material particles is a plurality of first solid-state electroactive material particles, and the second solid-state electroactive material is in the form of a plurality of second solid-state-electroactive material particles and each solid-state electroactive material particle of the plurality of second solid-state electroactive material particles has an average porosity ranging from greater than or equal to about 10% to less than or equal to about 75%.

17. The all-solid-state electrochemical cell of claim 16, wherein the first solid-state electroactive material is selected from the group consisting of: sulfur (S), ferrous sulfide ($FeS_2$), ferrous fluoride ($FeF_2$), and combinations thereof, and the second solid-state electroactive material is selected from the group consisting of silicon, silicon dioxide ($SiO_2$), tin (Sn), ferrous disulfide ($FeS_2$), ferrous sulfide ($Fe_{1-x}S$, where $0 \leq x \leq 0.2$), one or more carbon lithium hosts, and combinations thereof.

18. The all-solid-state electrochemical cell of claim 17, wherein the first solid-state electroactive material is sulfur and each first particle has an average porosity ranging from greater than or equal to about 10 wt. % to less than or equal to about 45 wt. %.

19. The all-solid-state electrochemical cell of claim 11, wherein the separator is formed from a solid-state electrolyte selected from the group consisting of: from the group consisting of: $Li_{10}MP_2S_{12}$ (where M is selected from silicon (Si), tin (Sn), and germanium (Ge)), $(Li_2S)_x(MS_2)_y(P_2S_5)_{100-x-y}$ (where M is selected from silicon (Si), tin (Sn), and germanium (Ge) and where $40 \leq x \leq 85$, $0 \leq y \leq 40$, and $100-x-y>0$), polyethylene oxide (PEO), polyacrylonitrile (PAN), lithium lanthanum titanate ($Li_{0.67-x}LA_{3x}TiO_3$) (LLTO), lithium lanthanum zirconium oxide ($Li_7La_3Zr_2O_{12}$) (LLZO), lithium aluminum titanium phosphate ($Li_{1.3}Al_{0.3}Ti_{1.7}(PO_4)_3$) (LATP), oxide glass, and combinations thereof.

20. The all solid-state electrochemical cell of claim 19, wherein the solid-state electrolyte further comprises one or more dopants selected from the group consisting of lithium chloride (LiCl), lithium iodide (LiI), and combinations thereof, or one or more salts selected from the group consisting of lithium perchlorate ($LiClO_4$), lithium hexafluorophosphate ($LiPF_6$), lithium bis(trifluoromethanesulfonyl)imide (LiTFSI), lithium bis(fluorosulfonyl)imide (LiFSI) and combinations thereof.

* * * * *